United States Patent
Hammon et al.

(10) Patent No.: US 7,155,801 B2
(45) Date of Patent: Jan. 2, 2007

(54) METHOD FOR RELEASABLY CONNECTING A COLUMN PLATE TO A SUPPORTING RING IN A COLUMN VIA A CLAMP

(75) Inventors: Ulrich Hammon, Mannheim (DE); Juergen Schroeder, Ludwigshafen (DE)

(73) Assignee: BASF Aktiengesellschaft, Ludwigshafen (DE)

(*) Notice: Subject to any disclaimer, the term of this patent is extended or adjusted under 35 U.S.C. 154(b) by 214 days.

(21) Appl. No.: 10/494,373

(22) PCT Filed: Dec. 4, 2002

(86) PCT No.: PCT/EP02/13728

§ 371 (c)(1),
(2), (4) Date: May 13, 2004

(87) PCT Pub. No.: WO03/047713

PCT Pub. Date: Jun. 12, 2003

(65) Prior Publication Data

US 2005/0005418 A1    Jan. 13, 2005

(30) Foreign Application Priority Data

Dec. 6, 2001  (DE) ................................ 101 59 823

(51) Int. Cl.
*B23Q 7/00*  (2006.01)
*B23P 11/00*  (2006.01)
*F02M 29/04*  (2006.01)

(52) U.S. Cl. ..................................... 29/559; 29/525.11
(58) Field of Classification Search ................ 29/559, 29/428, 525.01, 525.11; 261/114.5, 113, 261/114.1, 114.4
See application file for complete search history.

(56) References Cited

U.S. PATENT DOCUMENTS

| 4,174,363 A | * | 11/1979 | Bruckert ................... 261/114.5 |
| 5,547,617 A | * | 8/1996 | Lee et al. ................. 261/114.5 |
| 5,788,895 A | * | 8/1998 | Altinger et al. .......... 261/114.5 |

FOREIGN PATENT DOCUMENTS

| DE | 1125406 | 3/1962 |
| DE | 1920268 | 10/1970 |
| EP | 0856343 | 8/1998 |

OTHER PUBLICATIONS

U.S. Appl. No. 10/515,639, filed Dec. 7, 2004, Hammon et al.
U.S. Appl. No. 10/494,373, filed May 13, 2004, Hammon et al.

* cited by examiner

*Primary Examiner*—John C. Hong
(74) *Attorney, Agent, or Firm*—Oblon, Spivak, McClelland, Maier & Neustadt, P.C.

(57) ABSTRACT

A method for using a clamp for detachable connection of a column tray to a support ring in a column including using a clamp which includes a bolt lower clamp part connected to the bolt. The lower clamp part has at least one orifice through which a liquid present in the column can flow away.

5 Claims, 2 Drawing Sheets

FIG.1a
FIG.1c
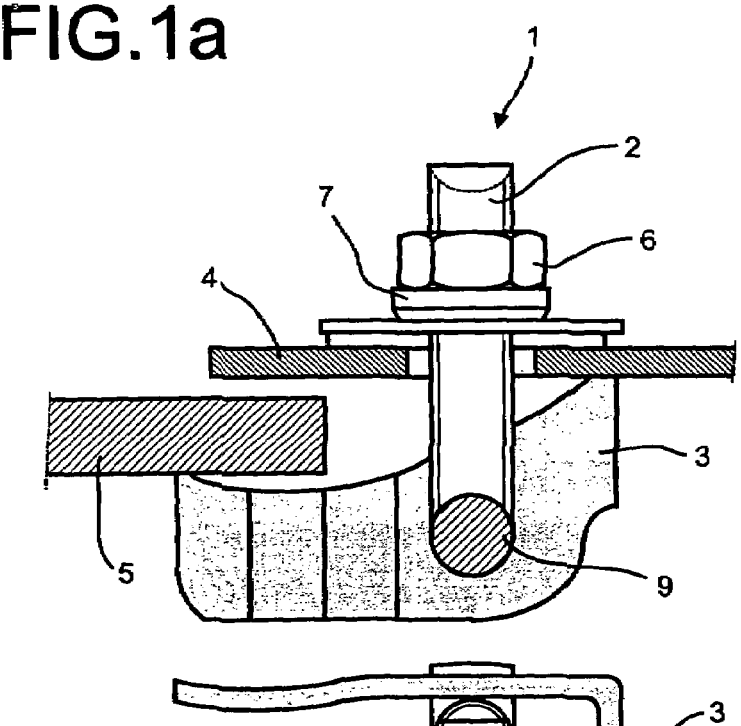
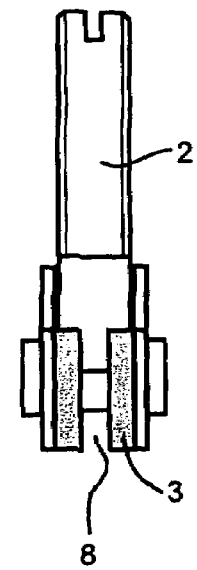
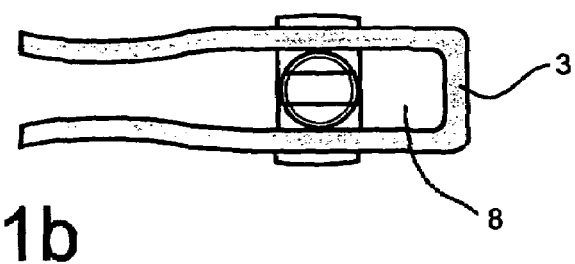
FIG.1b

FIG.2a
PRIOR ART
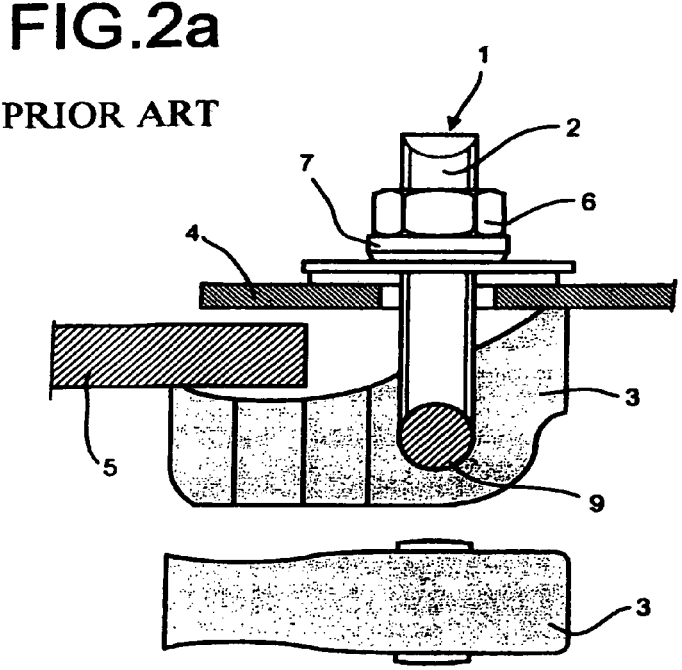
FIG.2b
PRIOR ART
FIG.2c
PRIOR ART
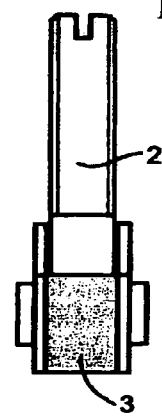

METHOD FOR RELEASABLY CONNECTING A COLUMN PLATE TO A SUPPORTING RING IN A COLUMN VIA A CLAMP

FIELD OF THE INVENTION

The present invention relates to a clamp for the detachable connection of a column tray to a support ring in a column, and the use.

DISCUSSION OF THE BACKGROUND

In thermal separation processes, columns which have trays, for example sieve trays, valve trays, dual-flow trays, etc., as internals having separation activity are frequently used. The trays must be detachably fastened to the inner wall of the column, as a rule via a support ring. For this purpose, it is usual to screw the trays to the support ring, for example as described in EP-A 0 856 343. However, it is also possible to carry out the detachable connection of the tray to the support ring by means of clamps.

Suitable thermal separation processes are in particular the rectification and absorption processes. Here, it is frequently necessary to treat thermally unstable substances which tend to polymerize under the process conditions. Particularly critical here are, inter alia, the connecting elements between trays and support rings, i.e. the screws or clamps described above.

EP-A 0 856 343 discloses a retaining apparatus for column trays, an orifice through which liquid can flow away being provided in at least a part of the retaining apparatus.

SUMMARY OF THE INVENTION

It is an object of the present invention to provide an improved clamp for detachable connection of a column tray to a support ring in a column, which clamp ensures that liquid which has penetrated into the clamp flows away reliably and is moreover simpler to mount.

We have found that this object is achieved by a clamp for detachable connection of a column tray to a support ring in a column, comprising a bolt and a lower clamp part connected to the bolt, the lower clamp part having at least one orifice through which a liquid present in the column can flow away.

In mass transfer columns which contain trays as internals having separation activity, as a rule support rings are firmly connected, usually welded, to the inner wall of the column for detachable fastening of said trays.

The novel clamp for detachable fastening of a column tray to a support ring is formed as one piece and comprises a bolt and a lower clamp part connected thereto.

Since the column trays are usually installed horizontally in the vertical column, the bolts of the clamps are as a rule likewise arranged vertically in the installed state.

The lower clamp part which is movably connected to the bolt has, according to the invention, at least one orifice through which liquid present in the column can flow away.

Here, the geometric formation of the orifice is not limited to a specific shape and size, and all that is necessary is that the orifice be sufficiently large for liquid to be able to flow away through it. As a rule, a hydraulic diameter of 1–15 mm, preferably 1–7 mm, is sufficient for this purpose. The cross-sectional shape of the orifice or orifices in a horizontal plane can in principle be as desired, for example circular, semicircular or polygonal shapes being possible.

The bolts in the lower clamp part are preferably connected via an axial joint which is movable in the vertical plane. This simplifies the installation and removal of the column trays.

Bolts and lower clamp parts made of stainless steel, preferably of stainless steel 1.4571 according to DIN 17007, are preferred.

The novel clamp is particularly suitable for use for an absorption and/or rectification column in which thermally unstable substances are absorbed and/or rectified. The soiling of the column by deposits due to polymerization of the thermally unstable substances can be considerably reduced by using the novel clamp.

The novel clamp is particularly suitable for use in rectification and/or absorption columns in which mixtures of substances containing one or more of the substances (meth)acrylic acid and/or esters thereof, acrylonitrile and/or styrene are treated.

BRIEF DESCRIPTION OF THE DRAWINGS

The invention is explained in more detail below with reference to a drawing and an embodiment.

Specifically,

FIG. 1a shows a longitudinal section through an embodiment of a novel clamp,

FIG. 1b shows a cross section through the embodiment shown in longitudinal section in FIG. 1a, FIG. 1c shows a longitudinal section in the sectional plane perpendicular to that shown in FIG. 1a, FIG. 2a shows a longitudinal section through an embodiment of a clamp according to the prior art, FIG. 2b shows a cross section through the embodiment shown in longitudinal section in FIG. 2a and FIG. 2c shows a longitudinal section in the sectional plane perpendicular to that shown in FIG. 2a.

In the figures, identical reference numerals denote identical or corresponding features of the apparatus.

DESCRIPTION OF THE PREFERRED EMBODIMENTS

The longitudinal section in FIG. 1a shows a clamp 1 with bolt 2 and lower clamp part 3, which are connected to one another via an axial joint 9. The clamp 1 serves for fastening a column tray 4 to a support ring 5. The bolt 2 is connected to the column tray 4 by means of a nut 6 and a seal 7.

The cross-sectional diagram in FIG. 1b illustrates the orifice 8 in the lower clamp part 3, it being possible to see that the orifice 8 passes completely through the lower clamp part 3 in the vertical direction thereof.

The longitudinal section shown in FIG. 1c also illustrates the complete extension of the orifice 8 in the vertical direction in the lower clamp part 3.

By comparison, FIG. 2 shows a clamp according to the prior art. In particular, the cross-sectional diagram in FIG. 2b and the longitudinal section shown in FIG. 2c illustrate that the lower clamp part 3 has no orifice running over the total vertical extension of said lower clamp part.

EXAMPLE

In a rectification column for the distillative purification of crude acrylic acid, i.e. of a mixture comprising the main components stated below in percentages by weight:

| | |
|---|---|
| Acetic acid: | 0.04% |
| Acrylic acid | 17.2% |
| Maleic anhydride | 0.7% |
| Diphyl | 64.0% |
| Dimethyl phthalate | 14.0% |
| Diacrylic acid | 1.9% |
| Water | 0.015% |
| Propionic acid | 0.008% |
| 2-Furfural | 0.021% |
| Benzaldehyde | 0.28% |
| Allyl acrylate | 0.02% |
| Benzoic acid | 1.4% |
| Phenothiazine | 0.028% | and comprising dual-flow trays, the dual-flow trays were fastened using novel clamps, corresponding to the schematic diagram in FIG. 1. The rectification column was inspected after an operating time of 35 days. The clamps were polymer-free.

COMPARATIVE EXAMPLE

In a comparative experiment, the same starting mixture was rectified in the same column, but the dual-flow trays were fastened using clamps corresponding to the schematic diagram in FIG. 2. The rectification column was likewise inspected after an operating time of 35 days. The clamps were adhesively bonded with polymer on the tops of the lower clamp parts.

We claim:

1. A method for detachably connecting a column tray to a support ring in an absorption and/or rectification column in which thermally unstable substances are absorbed and/or rectified, which comprises:

using a clamp formed as one piece, comprising a bolt and a lower clamp part connected to the bolt, positioning the lower clamp part so as to be movable in the vertical plane, providing in the lower clamp part at least one orifice through which a liquid present in the column can flow away; and detachably connecting said column tray to said support ring with said lower clamp part.

2. A method as claimed in claim 1, wherein the thermally unstable substances comprises (meth)acrylic acid and/or esters thereof, acrylonitrile and/or styrene.

3. A method as claimed in claim 1, which comprises forming the clamp from stainless steel.

4. A method as claimed in claim 3, which comprises forming the clamp from stainless steel 1.4571 according to DIN 17007.

5. A method as claimed in claim 1, which comprises providing a nut for engaging said bolt, said column tray being removable from the column by detaching said lower clamp part from said column tray.

* * * * *